(12) United States Patent
Kobayashi et al.

(10) Patent No.: US 9,857,567 B2
(45) Date of Patent: Jan. 2, 2018

(54) IMAGING LENS AND IMAGING APPARATUS

(71) Applicant: FUJIFILM Corporation, Tokyo (JP)

(72) Inventors: Hiroaki Kobayashi, Saitama (JP); Takeshi Kamiya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/361,097

(22) Filed: Nov. 25, 2016

(65) Prior Publication Data

US 2017/0199354 A1 Jul. 13, 2017

(30) Foreign Application Priority Data

Jan. 7, 2016 (JP) .................. 2016-001878

(51) Int. Cl.
*G02B 9/62* (2006.01)
*G02B 13/00* (2006.01)
*G02B 13/04* (2006.01)
*G02B 7/02* (2006.01)

(52) U.S. Cl.
CPC ......... *G02B 13/0045* (2013.01); *G02B 13/04* (2013.01); *G02B 7/028* (2013.01)

(58) Field of Classification Search
CPC .... G02B 13/0045; G02B 13/04; G02B 13/06; G02B 13/00; G02B 9/62
USPC ................ 359/708, 713, 754, 755, 756, 762
See application file for complete search history.

(56) References Cited

U.S. PATENT DOCUMENTS

| 9,459,432 B2 | 10/2016 | Komiyama | |
|---|---|---|---|
| 2005/0174463 A1* | 8/2005 | Ohzawa | G02B 13/06 348/335 |
| 2006/0274433 A1* | 12/2006 | Kamo | G02B 13/0095 359/793 |

FOREIGN PATENT DOCUMENTS

JP 2014-085559 A 5/2014

* cited by examiner

*Primary Examiner* — James Greece
(74) *Attorney, Agent, or Firm* — Studebaker & Brackett PC

(57) ABSTRACT

Provided are an imaging lens that has a small amount of focus shift caused by temperature fluctuation and an imaging apparatus that has this imaging lens. The imaging lens consists of, in order from an object side: a first lens that is convex toward the object side and has a negative refractive power; a second lens that has a negative refractive power; a third lens that has a positive refractive power; a fourth lens that has a positive refractive power; a fifth lens that has a positive refractive power; and a sixth lens that has a negative refractive power. The imaging lens satisfies the following conditional expressions (1) to (4).

$-0.89 < f/f12 < -0.53$      (1)

$-0.19 < f/f1 < -0.1$      (2)

$-0.70 < f/f2 < -0.45$      (3)

$2.4 < f1/f2 < 5.7$      (4)

20 Claims, 6 Drawing Sheets

EXAMPLE 1

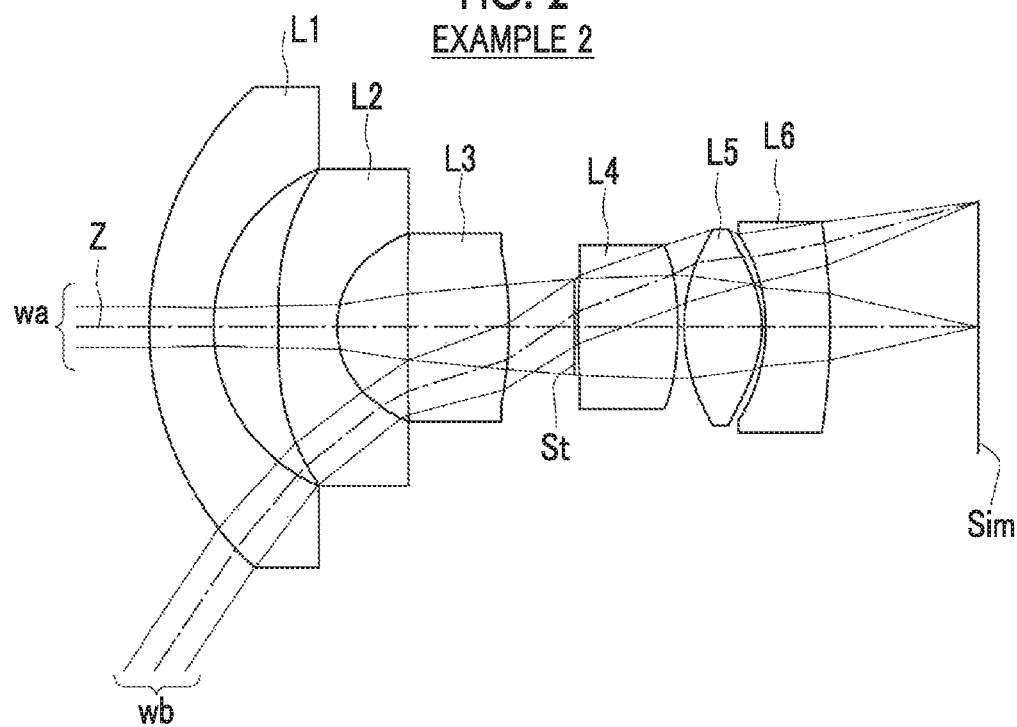
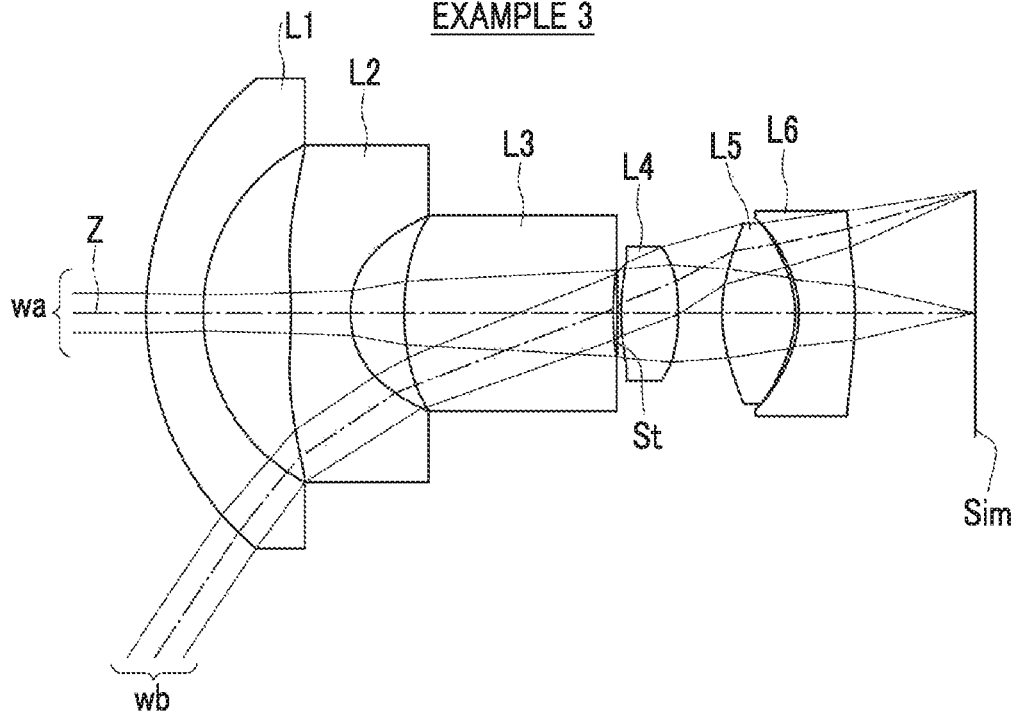

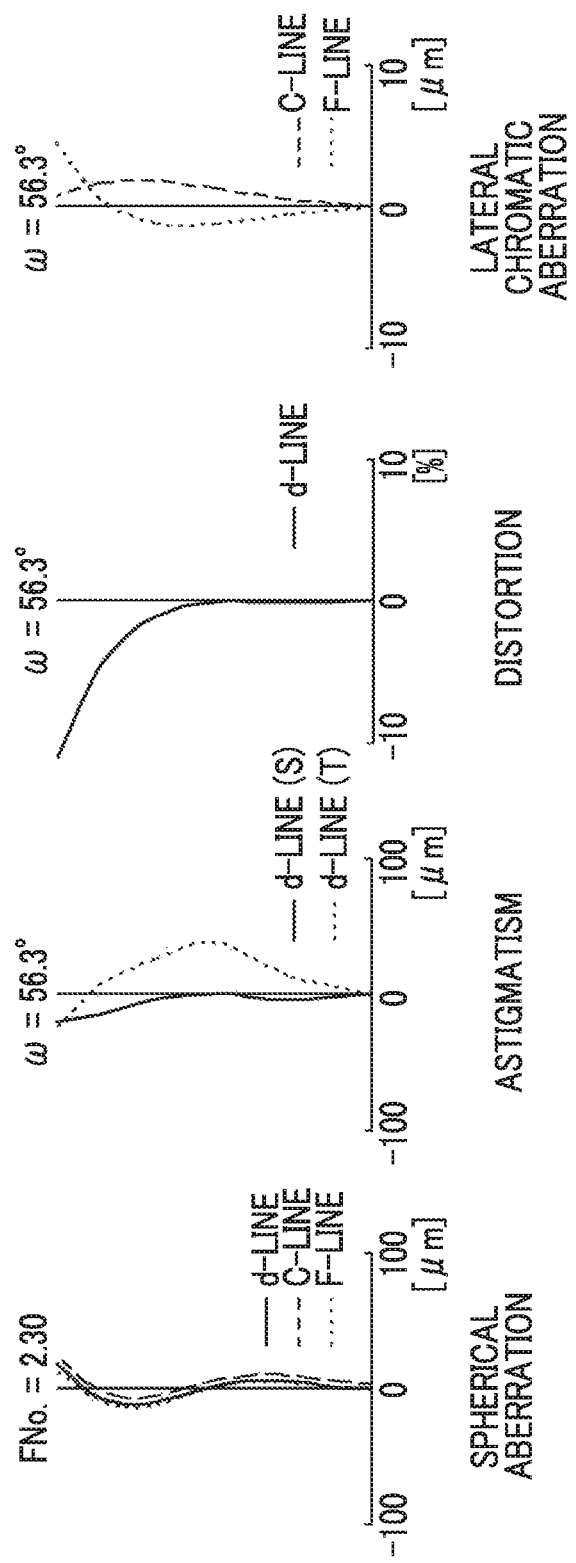

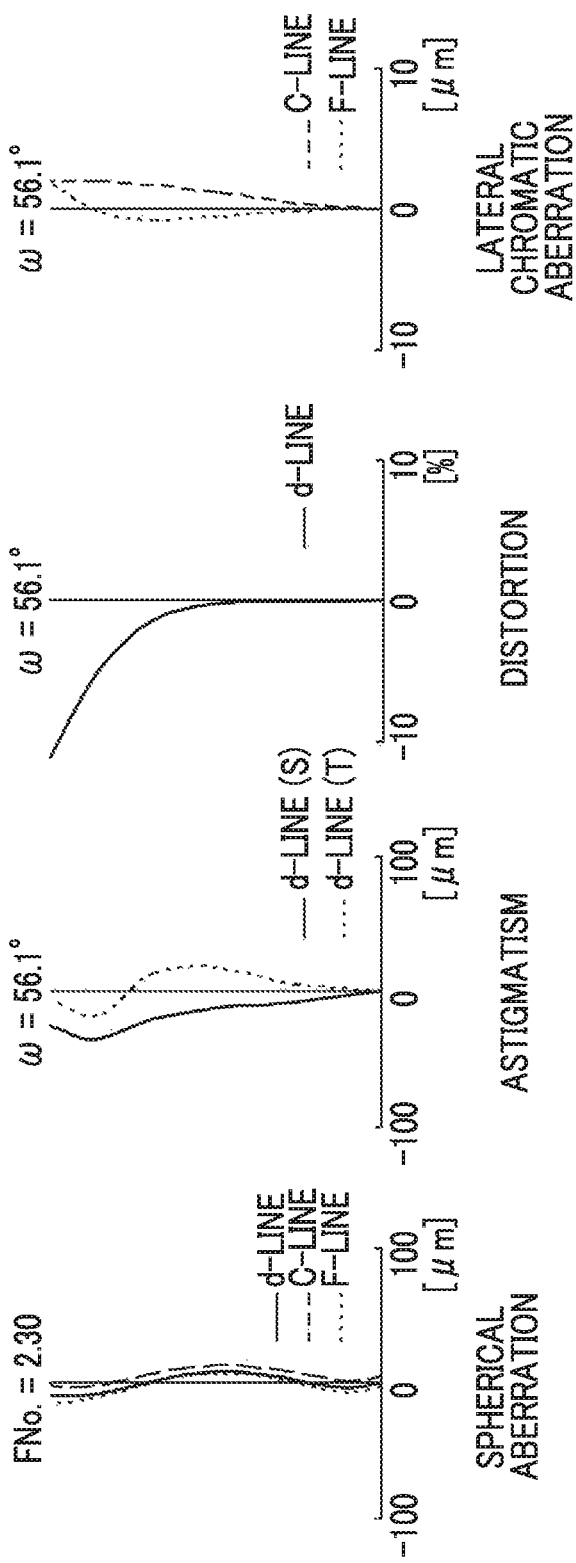

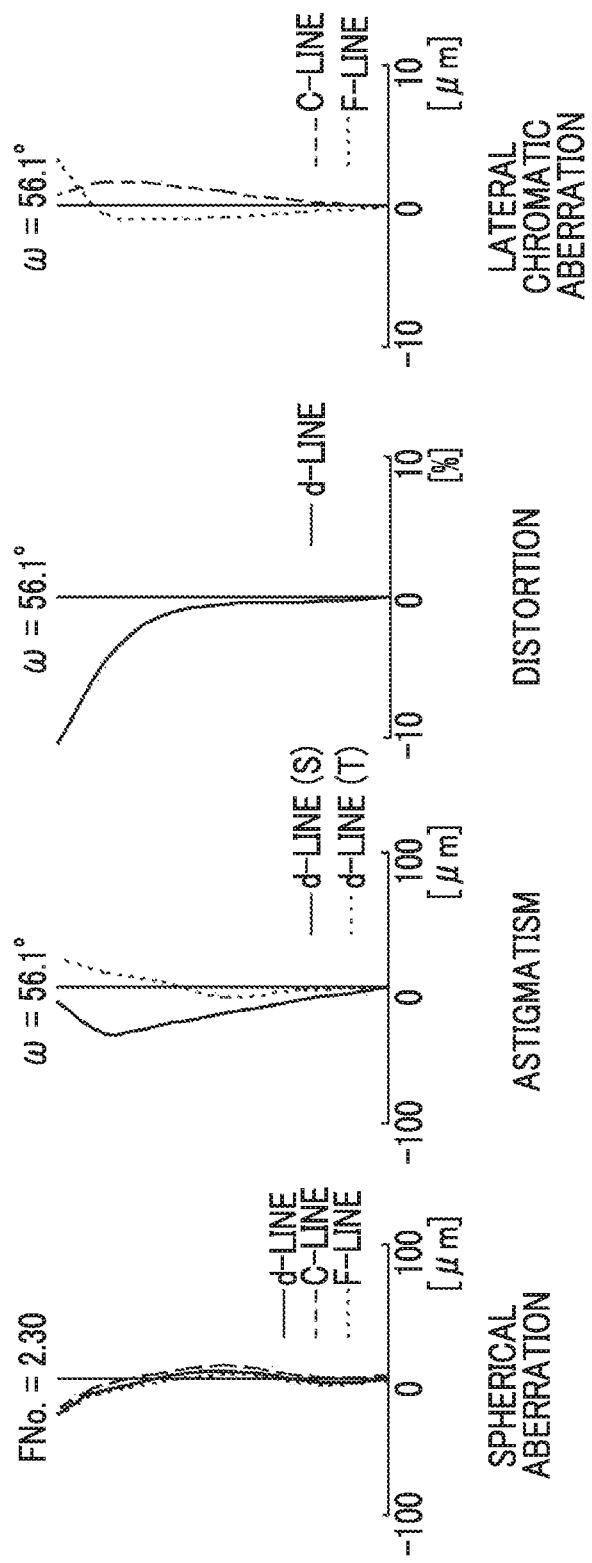

IMAGING LENS AND IMAGING APPARATUS

CROSS-REFERENCE TO RELATED APPLICATIONS

The present application claims priority under 35 U.S.C. §119 to Japanese Patent Application No. 2016-001878, filed on Jan. 7, 2016. Each of the above application(s) is hereby expressly incorporated by reference, in its entirety, into the present application.

BACKGROUND OF THE INVENTION

1. Field of the Invention

The present invention relates to an imaging lens that is appropriate for an on-board camera and an imaging apparatus that has the imaging lens.

2. Description of the Related Art

Recently, cameras are mounted on a vehicle, and are used to assist a driver to check blind areas such as sides lateral to the driver and/or a rear side or are used to recognize images such as vehicles around own vehicle, pedestrians, and/or obstacles. Among these cameras, a front sensing camera for vehicle collision prevention and/or automatic brake application is used to mostly capture an image of a traffic light far from the front of a vehicle and/or an image of a brake lamp of a vehicle running forward, and detect the traffic light, the brake lamp, and/or the like through image identification software. As an imaging lens usable in such an on-board camera, for example, an imaging lens described in JP2014-85559A to be described later is known. JP2014-85559A discloses a lens system having six elements.

SUMMARY OF THE INVENTION

The above-mentioned front sensing camera is mostly provided in the vicinity of a front glass in a vehicle. However, in a state where a vehicle is stopped particularly in summer, a temperature of an inside of the vehicle tends to be extremely increased by the greenhouse effect as compared with a temperature of the outside of the vehicle. Thus, there is a concern that focus shift caused by temperature fluctuation becomes larger than that in a case where a camera is provided outside the vehicle.

In the related art, in an imaging lens for an on-board camera, generally, a lens (first lens) closest to an object side is made of glass in order to cope with yellowing and/or scratch, and second and following lenses are made of resin in order to reduce costs. Further, since it is necessary for the imaging lens for the on-board camera to have a certain degree of wide-angle performance, it is necessary for the first lens or the first and second lenses from the object side to have certain degrees of negative powers. In order to cope with the focus shift caused by temperature fluctuation, generally, a power of the first lens made of glass, which less causes deformation due to temperature fluctuation, is increased, and a power of the second lens made of resin, which more causes the deformation due to temperature fluctuation, is decreased.

However, the front sensing camera is provided in a vehicle which is a closed room, and the first lens is directly exposed to sun light. Thus, even in a case where the first lens is made of glass, a power thereof is large, and thus there is a concern that an amount of focus shift caused by temperature fluctuation becomes large.

The present invention has been made in consideration of the above-mentioned situation, and its object is to provide an imaging lens that has a small amount of focus shift caused by temperature fluctuation and an imaging apparatus that comprises this imaging lens.

The imaging lens of the present invention consists of, in order from an object side: a first lens that is convex toward the object side and has a negative refractive power; a second lens that has a negative refractive power; a third lens that has a positive refractive power; a fourth lens that has a positive refractive power; a fifth lens that has a positive refractive power; and a sixth lens that has a negative refractive power. The imaging lens satisfies the following conditional expressions (1) to (4).

$$-0.89 < f/f12 < -0.53 \quad (1)$$

$$-0.19 < f/f1 < -0.1 \quad (2)$$

$$-0.70 < f/f2 < -0.45 \quad (3)$$

$$2.4 < f1/f2 < 5.7 \quad (4)$$

Here, f is a focal length of a whole system,
f12 is a composite focal length of the first lens and the second lens,
f1 is a focal length of the first lens, and
f2 is a focal length of the second lens.

It is preferable that the imaging lens of the present invention satisfies the above-mentioned conditional expressions (1) to (4), and satisfies any one or a plurality of combinations of the following conditional expressions (1-1) to (4-1).

$$-0.81 < f/f12 < -0.61 \quad (1-1)$$

$$-0.17 < f/f1 < -0.11 \quad (2-1)$$

$$-0.64 < f/f2 < -0.47 \quad (3-1)$$

$$2.7 < f1/f2 < 5.2 \quad (4-1)$$

An imaging apparatus of the present invention comprises the above-mentioned imaging lens of the present invention.

It should be noted that a term "includes, substantially ~" means that the imaging lens may include not only the above-mentioned elements but also lenses substantially having no powers, optical elements, which are not lenses, such as a diaphragm, a mask, a cover glass, and a filter, and mechanism parts such as a lens flange, a lens barrel, an imaging element, and/or a hand shaking correction mechanism.

Further, reference signs of surface shapes, radii of curvature, and/or refractive powers of the lenses are assumed as those in paraxial regions in a case where some lenses have aspheric surfaces.

The imaging lens of the present invention consists of, in order from an object side: the first lens that is convex toward the object side and has a negative refractive power; the second lens that has a negative refractive power; the third lens that has a positive refractive power; the fourth lens that has a positive refractive power; the fifth lens that has a positive refractive power; and the sixth lens that has a negative refractive power. The imaging lens satisfies the following conditional expressions (1) to (4). Therefore, it is possible to form an imaging lens that has a small amount of focus shift caused by temperature fluctuation.

$$-0.89 < f/f12 < -0.53 \quad (1)$$

$$-0.19 < f/f1 < -0.1 \quad (2)$$

$$-0.70 < f/f2 < -0.45 \qquad (3)$$

$$2.4 < f1/f2 < 5.7 \qquad (4)$$

Further, the imaging apparatus of the present invention comprises the imaging lens of the present invention. Thus, it is possible to appropriately perform imaging in a wide temperature range.

BRIEF DESCRIPTION OF THE DRAWINGS

FIG. 2 is a cross-sectional view illustrating a lens configuration of an imaging lens of Example 2 of the present invention.

FIG. 3 is a cross-sectional view illustrating a lens configuration of an imaging lens of Example 3 of the present invention.

FIG. 4 is a diagram of aberrations of the imaging lens of Example 1 of the present invention.

FIG. 5 is a diagram of aberrations of the imaging lens of Example 2 of the present invention.

FIG. 6 is a diagram of aberrations of the imaging lens of Example 3 of the present invention.

DESCRIPTION OF THE PREFERRED EMBODIMENTS

Figure 1:
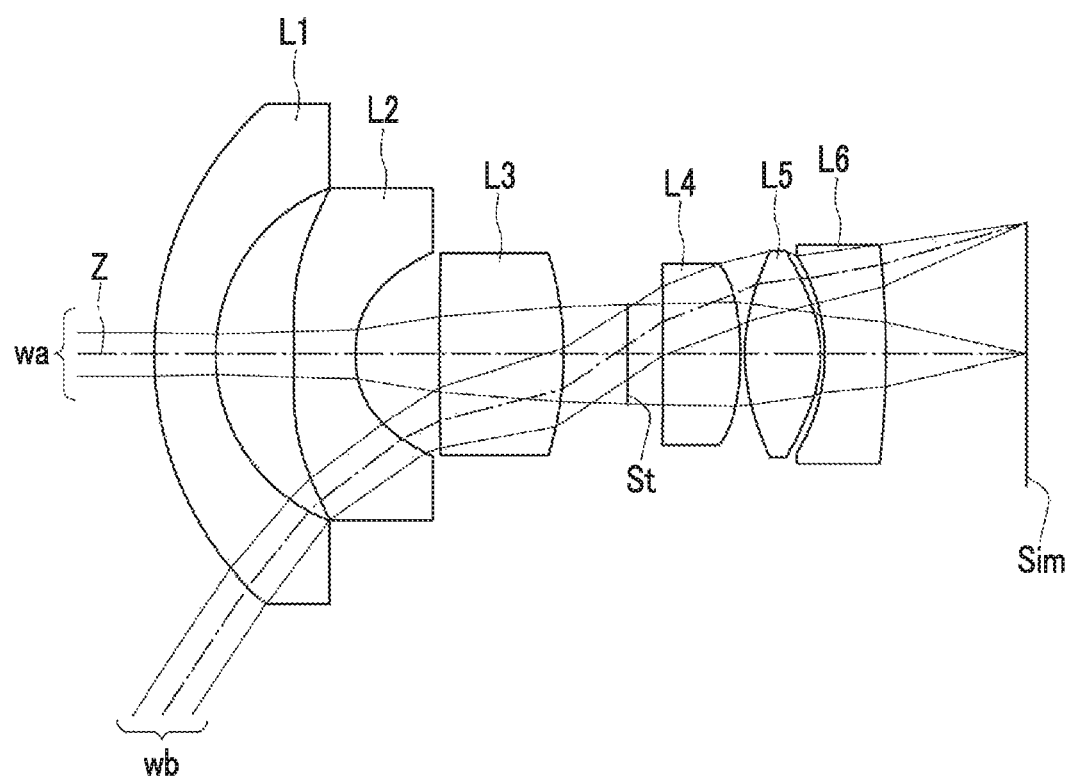
FIG. 1 is a cross-sectional view illustrating a lens configuration of an imaging lens (common to Example 1) according to an embodiment of the present invention.

Hereinafter, embodiments of the present invention will be described with reference to drawings. FIG. 1 is a cross-sectional view illustrating a lens configuration of an imaging lens according to an embodiment of the present invention. The exemplary configuration shown in FIG. 1 is the same as the configuration of the imaging lens of Example 1 to be described later. In FIG. 1, a left side thereof is an object side, and a right side thereof is an image side. In addition, an aperture diaphragm St shown in the drawing does not necessarily indicate its sizes and/or shapes, but indicates a position of the diaphragm on the optical axis Z. Further, on-axis rays wa and rays with a maximum angle of view wb are also shown together.

As shown in FIG. 1, the imaging lens includes, substantially in order from the object side: a first lens L1 that is convex toward the object side and has a negative refractive power; a second lens L2 that has a negative refractive power; a third lens L3 that has a positive refractive power; a fourth lens L4 that has a positive refractive power; a fifth lens L5 that has a positive refractive power; and a sixth lens L6 that has a negative refractive power.

As described above, an object side surface of the first lens L1 is formed as a convex surface, and thereby it becomes easy to correct distortion of peripheral portion even in a wide-angle lens.

Both of the first lens L1 and the second lens L2, which are two lenses disposed in order from the most object side, are formed as negative lenses, and thereby it becomes easy to increase an angle of view of the whole lens system.

The third lens L3, which is disposed after the first lens L1 and second lens L2, is formed as a positive lens, and thereby it is possible to favorably correct a curvature of field.

The imaging lens is configured to satisfy the following conditional expressions (1) to (4).

First, the conditional expression (1) will be described. By not allowing the result of the conditional expression (1) to be equal to or greater than the upper limit, it is possible to prevent a negative composite refractive power of the first lens L1 and the second lens L2 from extremely decreasing. Thus, this contributes to wide-angle. By not allowing the result of the conditional expression (1) to be equal to or less than the lower limit, it is possible to prevent the negative composite refractive power of the first lens L1 and the second lens L2 from extremely increasing. As a result, it is possible to prevent an absolute value of radius of curvature of each surface of the lenses from extremely decreasing. Thus, it is possible to prevent high-order aberrations from occurring.

Next, the conditional expressions (2) to (4) will be described. By allowing the first lens L1 and the second lens L2 to have negative powers necessary for wide-angle such that the conditional expressions (2) to (4) are satisfied, a power of the first lens L1 having a largest amount of temperature fluctuation is set to be relatively small, and a power of the second lens L2 having an amount of temperature fluctuation smaller than that of the first lens L1 is set to be relatively large. Thereby, it is possible to reduce an amount of focus shift caused by temperature fluctuation of the whole lens system.

Particularly, by not allowing the result of the conditional expression (2) to be equal to or greater than the upper limit, it becomes easy to increase an angle of view thereof. By not allowing the result of the conditional expression (2) to be equal to or less than the lower limit, rays are gently deflected by the first lens L1, and thus it becomes easy to correct distortion.

By not allowing the result of the conditional expression (3) to be equal to or greater than the upper limit, it becomes easy to increase an angle of view thereof. By not allowing the result of the conditional expression (3) to be equal to or less than the lower limit, rays are gently deflected by the second lens L2, and thus it becomes easy to correct distortion.

By not allowing the result of the conditional expression (4) to be equal to or greater than the upper limit, rays, which are incident from a wide angle of view, are deflected stepwise. Thus, it is possible to prevent high-order aberrations from occurring. By not allowing the result of the conditional expression (4) to be equal to or less than the lower limit, it becomes easy to correct lateral chromatic aberration.

$$-0.89 < f/f12 < -0.53 \qquad (1)$$

$$-0.19 < f/f1 < -0.1 \qquad (2)$$

$$-0.70 < f/f2 < -0.45 \qquad (3)$$

$$2.4 < f1/f2 < 5.7 \qquad (4)$$

Here, f is a focal length of a whole system,
f12 is a composite focal length of the first lens and the second lens,
f1 is a focal length of the first lens, and
f2 is a focal length of the second lens.

If the imaging lens of the present invention satisfies the above-mentioned conditional expressions (1) to (4) and satisfies any one or a plurality of combinations of the following conditional expressions (1-1) to (4-1), more favorable characteristics can be obtained.

$$-0.81 < f/f12 < -0.61 \qquad (1-1)$$

$$-0.17 < f/f1 < -0.11 \qquad (2-1)$$

$$-0.64 < f/f2 < -0.47 \quad (3\text{-}1)$$

$$2.7 < f1/f2 < 5.2 \quad (4\text{-}1)$$

In a case of using the imaging lens under severe environment, it is possible to perform protective multilayer film coating. Not only the protective coating but also antireflective coating for reducing ghost light in use may be performed.

If the imaging lens is intended to be applied to imaging apparatus, a cover glass, a prism, and/or various filters such as an infrared cut filter and a lowpass filter may be disposed between the lens system and an image plane Sim in accordance with a configuration of a camera on which the lens is mounted. In addition, instead of positioning such various filters between the lens system and the image plane Sim, such various filters may be disposed between lenses, and coating for applying the same effects as the various filters may be performed on a lens surface of any one lens thereof.

Next, numerical examples of the imaging lens of the present invention will be described.

First, the imaging lens of Example 1 will be described. FIG. 1 is a cross-sectional view illustrating a lens configuration of the imaging lens of Example 1. In FIG. 1 and FIGS. 2 to 3 corresponding to Examples 2 to 3 to be described later, left sides thereof are the object side, and right sides thereof are the image side. In addition, the aperture diaphragm St shown in the drawings does not necessarily indicate its sizes and/or shapes, and indicates a position of the diaphragm on the optical axis Z.

Table 1 shows basic lens data of the imaging lens of Example 1, Table 2 shows data about specification thereof, and Table 3 shows data about aspheric coefficients thereof. Hereinafter, meanings of the reference signs in the tables are, for example, as described in Example 1, and are basically the same as those in Examples 2 to 3.

In the lens data of Table 1, the column of the surface number shows surface numbers. The surface of the elements closest to the object side is the first surface, and the surface numbers sequentially increase toward the image side. The column of the radius of curvature shows radii of curvature of the respective surfaces. The column of the surface distance shows distances on the optical axis Z between the respective surfaces and the subsequent surfaces. The column of n shows refractive indexes of the respective optical elements at the d-line (a wavelength of 587.6 nm, where nm represents nanometer). The column of ν shows Abbe numbers of the respective optical elements at the d-line (a wavelength of 587.6 nm).

Here, the sign of the radius of curvature is positive in a case where a surface has a shape convex toward the object side, and is negative in a case where a surface has a shape convex toward the image side. The basic lens data also includes and indicates the aperture diaphragm St. In a place of a surface number of a surface corresponding to the aperture diaphragm St, the surface number and a term of (diaphragm) are noted.

The data about specification of Table 2 shows values of a focal length f' of the whole system, a back focal length Bf', an F number FNo., and a total angle of view 2ω.

In the basic lens data and the data about specification, degree ([°]) is used as a unit of an angle, and millimeter (mm) is used as a unit of a length, but appropriate different units may be used since the optical system can be used even in a case where the system is enlarged or reduced in proportion.

In the lens data of Table 1, the reference sign * is attached to surface numbers of aspheric surfaces, and radii of curvature of the aspheric surfaces are represented by numerical values of paraxial radii of curvature. The data about aspheric coefficients of Table 3 shows the surface numbers of the aspheric surfaces and aspheric coefficients of the aspheric surfaces. The aspheric coefficients are values of the coefficients KA and Am (m=3, . . . , 20) in aspheric surface expression represented as the following expression.

$$Zd = C \cdot h^2 / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, and KA and Am are aspheric coefficients (m=3, . . . , 20).

TABLE 1

Example 1 Lens Data (n and ν are at d-line)

| Surface number | Radius of curvature | Surface distance | n | ν |
|---|---|---|---|---|
| 1 | 8.1637 | 1.5072 | 1.72916 | 54.68 |
| 2 | 4.3357 | 1.9262 | | |
| *3 | −22.0674 | 1.5028 | 1.53112 | 55.30 |
| *4 | 3.1542 | 2.0548 | | |
| 5 | 79.1625 | 3.0315 | 1.83400 | 37.34 |
| 6 | −8.1095 | 1.5685 | | |
| 7 (Diaphragm) | ∞ | 0.8554 | | |
| *8 | 73.7537 | 1.9088 | 1.53112 | 55.30 |
| *9 | −8.8845 | 0.1076 | | |
| *10 | 4.1251 | 1.8600 | 1.53112 | 55.30 |
| *11 | −3.0110 | 0.1013 | | |
| 12 | −4.5243 | 1.5000 | 1.95906 | 17.47 |
| 13 | −22.9887 | 3.4699 | | |

TABLE 2

Example 1 Specification

| | |
|---|---|
| f' | 2.40 |
| Bf' | 3.47 |
| FNo. | 2.30 |
| 2ω[°] | 112.6 |

TABLE 3

Example 1 Aspheric Coefficients

| Surface number | 3 | 4 | 8 | 9 |
|---|---|---|---|---|
| KA | −6.3780907E+02 | 9.0454896E−01 | −2.6856241E+03 | 8.4981204E+00 |
| A3 | −2.0669099E−18 | −5.8223475E−18 | −4.4487105E−17 | −1.4938872E−19 |
| A4 | 1.4380625E−02 | 3.3027545E−02 | −5.9278717E−05 | −2.0425054E−02 |
| A5 | 2.8980451E−04 | −4.2906902E−04 | 6.0880794E−04 | −1.7779162E−03 |
| A6 | −1.8035031E−03 | −2.2251616E−03 | 8.0122730E−04 | 1.2469331E−02 |

TABLE 3-continued

Example 1 Aspheric Coefficients

| A7 | −4.0483864E−04 | −3.0782956E−03 | −9.6855187E−04 | −4.5974803E−04 |
| A8 | 3.0404371E−04 | 1.4045470E−03 | −5.4422072E−04 | −3.6362959E−03 |
| A9 | 5.9951858E−05 | 5.1032704E−04 | 8.0391016E−05 | 2.1385286E−05 |
| A10 | −3.4519061E−05 | −1.1641892E−04 | 1.4965159E−04 | 6.4087785E−04 |
| A11 | −5.4051637E−06 | −3.8655989E−05 | −1.7324213E−05 | −2.5451216E−06 |
| A12 | 2.5613476E−06 | −4.8313075E−05 | −1.9729840E−05 | −6.8693765E−05 |
| A13 | 3.0706269E−07 | 1.1246354E−06 | 1.9602881E−06 | 3.7196794E−07 |
| A14 | −1.2148328E−07 | 1.4323344E−05 | 1.4481259E−06 | 4.5900158E−06 |
| A15 | −1.0506269E−08 | 4.2820777E−08 | −1.1062737E−07 | −2.6524069E−08 |
| A16 | 3.4595272E−09 | −1.8150488E−06 | −6.1396583E−08 | −1.8749492E−07 |
| A17 | 1.9856391E−10 | −1.9536580E−09 | 3.1157271E−09 | 9.1471149E−10 |
| A18 | −5.2666556E−11 | 1.1513508E−07 | 1.4100682E−09 | 4.2807384E−09 |
| A19 | −1.5921881E−12 | −3.5292782E−11 | −3.4967751E−11 | −1.2341116E−11 |
| A20 | 3.1858511E−13 | −2.9165384E−09 | −1.3620941E−11 | −4.1845315E−11 |

| Surface number | 10 | 11 |
|---|---|---|
| KA | 6.4378590E−01 | 8.7390392E−01 |
| A3 | 2.0116759E−18 | −6.9002226E−18 |
| A4 | −2.3485358E−02 | 4.4979777E−03 |
| A5 | 1.4560556E−03 | 1.1550579E−02 |
| A6 | 1.2956495E−02 | −4.8564808E−03 |
| A7 | −1.7517988E−03 | −5.5819804E−03 |
| A8 | −4.3139127E−03 | 3.8230974E−03 |
| A9 | 6.5617634E−04 | 2.3421670E−03 |
| A10 | 9.5946722E−04 | −1.8433968E−03 |
| A11 | −1.4363346E−04 | −5.9272795E−04 |
| A12 | −1.4259928E−04 | 5.3523446E−04 |
| A13 | 1.9100862E−05 | 9.2574531E−05 |
| A14 | 1.3443779E−05 | −9.6011554E−05 |
| A15 | −1.5188692E−06 | −8.8097932E−06 |
| A16 | −7.4642904E−07 | 1.0367141E−05 |
| A17 | 6.6647968E−08 | 4.6749657E−07 |
| A18 | 2.1520824E−08 | −6.1338478E−07 |
| A19 | −1.2440238E−09 | −1.0616900E−08 |
| A20 | −2.3651365E−10 | 1.5221997E−08 |

FIG. 4 shows aberration diagrams of the imaging lens of Example 1. In addition, in order from the left side of FIG. 4, spherical aberration, astigmatism, distortion, and lateral chromatic aberration are shown. Such aberration diagrams show aberrations in a state where the object distance is set as an infinite distance. The aberration diagrams illustrating spherical aberration, astigmatism, and distortion indicates aberrations that occur when the d-line (a wavelength of 587.6 nm) is set as a reference wavelength. In the spherical aberration diagram, aberrations at the d-line (a wavelength of 587.6 nm), the C-line (a wavelength of 656.3 nm), and the F-line (a wavelength of 486.1 nm) are respectively indicated by the solid line, the long dashed line, and the short dashed line. In the astigmatism diagram, aberrations in sagittal and tangential directions are respectively indicated by the solid line and the short dashed line. In the lateral chromatic aberration diagram, aberrations at the C-line (a wavelength of 656.3 nm) and the F-line (a wavelength of 486.1 nm) are respectively indicated by the long dashed line and the short dashed line. In the spherical aberration diagram, FNo. indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted.

Next, an imaging lens of Example 2 will be described. FIG. 2 is a cross-sectional view illustrating a lens configuration of the imaging lens of Example 2. Further, Table 4 shows basic lens data of the imaging lens of Example 2, Table 5 shows data about specification thereof, and Table 6 shows data about aspheric coefficients thereof. FIG. 5 shows aberration diagrams thereof.

TABLE 4

Example 2 Lens Data (n and ν are at d-line)

| Surface number | Radius of curvature | Surface distance | n | ν |
|---|---|---|---|---|
| 1 | 8.2863 | 1.6384 | 1.75500 | 52.32 |
| 2 | 4.3990 | 1.6406 | | |
| *3 | −331.8913 | 1.5000 | 1.53112 | 55.30 |
| *4 | 2.7460 | 1.8021 | | |
| *5 | −1651.5669 | 2.5850 | 1.63360 | 23.61 |
| *6 | −8.4101 | 1.6657 | | |
| 7 (Diaphragm) | ∞ | 0.1009 | | |
| *8 | 34.6154 | 2.5421 | 1.53112 | 55.30 |
| *9 | −8.3410 | 0.1590 | | |
| *10 | 4.1669 | 1.9868 | 1.53112 | 55.30 |
| *11 | −2.8021 | 0.1000 | | |
| 12 | −4.3720 | 1.6164 | 1.95906 | 17.47 |
| 13 | −17.2422 | 3.8098 | | |

TABLE 5

Example 2 Specification

| f | 2.42 |
| Bf | 3.81 |
| FNo. | 2.30 |
| 2ω[°] | 112.2 |

TABLE 6

Example 2 Aspheric Coefficients

| Surface number | 3 | 4 | 5 | 6 |
|---|---|---|---|---|
| KA | −4.4015836E+04 | 1.0791805E+00 | −2.8023936E+10 | 2.0205630E+00 |
| A3 | 1.6563170E−18 | 1.0651118E−18 | 9.2042922E−19 | −2.7032971E−19 |
| A4 | 1.6759009E−02 | 2.6450853E−02 | −3.5714504E−04 | 5.8869937E−03 |
| A5 | −9.5142714E−03 | 2.1218993E−04 | 2.2856927E−03 | −1.4767692E−05 |
| A6 | −2.4611974E−03 | −4.4730736E−03 | −1.1604011E−03 | −5.5676126E−03 |
| A7 | −1.3572837E−04 | −3.2259348E−03 | −7.4233129E−04 | 2.2132624E−03 |
| A8 | 4.7624384E−04 | 2.6472498E−03 | 5.0568242E−04 | 3.2874915E−03 |
| A9 | 2.0367712E−05 | 8.9156055E−04 | 1.4329202E−04 | −1.6050610E−03 |
| A10 | −6.4511035E−05 | −8.8451840E−04 | −1.0680638E−04 | −1.0674795E−03 |
| A11 | −1.8168646E−06 | −1.5014762E−04 | −1.6794796E−05 | 5.6583172E−04 |
| A12 | 5.9611708E−06 | 1.7027590E−04 | 1.3544781E−05 | 1.8153934E−04 |
| A13 | 1.0981882E−07 | 1.6044654E−05 | 1.2136167E−06 | −1.1542707E−04 |
| A14 | −3.6386762E−07 | −1.9418936E−05 | −1.0684994E−06 | −8.7717326E−06 |
| A15 | −3.9673562E−09 | −1.0377080E−06 | −5.2944979E−08 | 1.3690073E−05 |
| A16 | 1.3863436E−08 | 1.2889440E−06 | 5.1030611E−08 | −2.0883691E−06 |
| A17 | 7.8458218E−11 | 3.7169318E−08 | 1.2806224E−09 | −8.7303629E−07 |
| A18 | −2.9729900E−10 | −4.6066858E−08 | −1.3447222E−09 | 3.5102782E−07 |
| A19 | −6.5325283E−13 | −5.6531992E−10 | −1.3206877E−11 | 2.3079285E−08 |
| A20 | 2.7275617E−12 | 6.8655317E−10 | 1.4955960E−11 | −1.6127385E−08 |

| Surface number | 8 | 9 | 10 | 11 |
|---|---|---|---|---|
| KA | −1.8432747E+02 | 8.3796861E+00 | 1.1992384E+00 | 7.4728880E−01 |
| A3 | 4.9239968E−17 | −4.1578423E−18 | 1.5563044E−18 | −2.6679346E−19 |
| A4 | 2.9409076E−03 | −2.2820046E−05 | −3.1141677E−03 | 6.0398333E−03 |
| A5 | 2.9949945E−03 | −3.6419773E−03 | −3.6390079E−03 | 9.8285858E−03 |
| A6 | −2.1765012E−03 | 1.7406001E−03 | 2.0821282E−03 | −2.6872199E−03 |
| A7 | −5.7369858E−04 | 6.9078916E−04 | 1.4561386E−03 | −4.2133807E−03 |
| A8 | 4.6733861E−04 | −4.4514242E−04 | −9.5090266E−04 | 1.6565516E−03 |
| A9 | −1.3254321E−05 | −1.0474607E−04 | −3.6393980E−04 | 1.9637149E−03 |
| A10 | −5.8557475E−05 | 5.4381309E−05 | 2.5879305E−04 | −9.0939186E−04 |
| A11 | 2.1177374E−06 | 8.4129646E−06 | 5.5537823E−05 | −5.4318223E−04 |
| A12 | 4.6736205E−06 | −3.6836599E−06 | −4.1763882E−05 | 2.8726806E−04 |
| A13 | −7.0170902E−08 | −3.9740999E−07 | −5.3188425E−06 | 9.2268116E−05 |
| A14 | −2.3734464E−07 | 1.4923178E−07 | 4.0199082E−06 | −5.3219691E−05 |
| A15 | 1.8378890E−10 | 1.1059341E−08 | 3.1069208E−07 | −9.5196956E−06 |
| A16 | 7.3109610E−09 | −3.6204847E−09 | −2.2700520E−07 | 5.7679663E−06 |
| A17 | 3.6280326E−11 | −1.6724023E−10 | −1.0061467E−08 | 5.4483335E−07 |
| A18 | −1.2398661E−10 | 4.8595427E−11 | 6.9520046E−09 | −3.3666151E−07 |
| A19 | −5.5703321E−13 | 1.0593147E−12 | 1.3795439E−10 | −1.3267904E−08 |
| A20 | 8.8528471E−13 | −2.7809168E−13 | −8.9256444E−11 | 8.1410215E−09 |

Next, an imaging lens of Example 3 will be described. FIG. 3 is a cross-sectional view illustrating a lens configuration of the imaging lens of Example 3. Further, Table 7 shows basic lens data of the imaging lens of Example 3, Table 8 shows data about specification thereof, and Table 9 shows data about aspheric coefficients thereof. FIG. 6 shows aberration diagrams thereof.

TABLE 7

Example 3 Lens Data (n and ν are at d-line)

| Surface number | Radius of curvature | Surface distance | n | ν |
|---|---|---|---|---|
| 1 | 7.9721 | 1.5001 | 1.88300 | 40.76 |
| 2 | 4.9809 | 2.3216 | | |
| *3 | −8.3528 | 1.5677 | 1.53112 | 55.30 |
| *4 | 3.1719 | 1.4122 | | |
| *5 | 6.4821 | 5.4888 | 1.63360 | 23.61 |
| *6 | 6.9333 | 0.1098 | | |
| 7 (Diaphragm) | ∞ | 0.1001 | | |
| *8 | 5.0780 | 1.5110 | 1.53112 | 55.30 |
| *9 | −6.2224 | 1.1511 | | |

TABLE 7-continued

Example 3 Lens Data (n and ν are at d-line)

| Surface number | Radius of curvature | Surface distance | n | ν |
|---|---|---|---|---|
| *10 | 3.6424 | 1.9288 | 1.53112 | 55.30 |
| *11 | −2.8503 | 0.1000 | | |
| *12 | −2.7293 | 1.5005 | 1.63360 | 23.61 |
| *13 | −10.5282 | 3.1695 | | |

TABLE 8

Example 3 Specification

| F' | 2.40 |
|---|---|
| Bf | 3.17 |
| FNo. | 2.30 |
| 2ω[°] | 112.2 |

TABLE 9

| | Example 3 Aspheric Coefficients | | | |
|---|---|---|---|---|
| Surface number | 3 | 4 | 5 | 6 |
| KA | −8.5116921E+01 | 9.9658851E−01 | −3.3792087E+01 | −2.2814797E+01 |
| A3 | 1.3322112E−18 | −1.0924182E−17 | 4.4235494E−18 | −1.8404365E−17 |
| A4 | 1.3357766E−02 | 5.6489543E−02 | 2.2329570E−02 | −8.3002686E−03 |
| A5 | −1.0731703E−03 | −2.4181984E−02 | −3.4821878E−03 | 2.0170028E−02 |
| A6 | −1.5305369E−03 | 3.6247847E−03 | −5.6847549E−03 | −6.7411470E−03 |
| A7 | 3.5087370E−05 | 7.1009980E−03 | 2.7347942E−03 | −6.1809546E−03 |
| A8 | 1.5659994E−04 | −6.7580978E−03 | 4.4009461E−04 | 9.2054843E−03 |
| A9 | −2.9108418E−06 | −1.0248062E−03 | −6.8399012E−04 | 2.2016228E−03 |
| A10 | −1.1082682E−05 | 2.8137340E−03 | 5.6208386E−05 | −4.1337655E−03 |
| A11 | 1.8433774E−07 | −1.1650447E−04 | 9.9253953E−05 | −5.5097774E−04 |
| A12 | 5.8027429E−07 | −6.8872304E−04 | −1.2271391E−05 | 1.0176678E−03 |
| A13 | −6.7841804E−09 | 6.2338492E−05 | −8.6800338E−06 | 8.7401981E−05 |
| A14 | −2.2377463E−08 | 1.1186287E−04 | 7.9110427E−07 | −1.5093822E−04 |
| A15 | 1.5890223E−10 | −8.7598307E−06 | 4.4963419E−07 | −8.4614742E−06 |
| A16 | 5.8061144E−10 | −1.1540917E−05 | −1.5690146E−08 | 1.3464213E−05 |
| A17 | −2.0937734E−12 | 5.5393104E−07 | −1.2694775E−08 | 4.5754651E−07 |
| A18 | −8.7922497E−12 | 6.6218964E−07 | −3.1657912E−10 | −6.6622330E−07 |
| A19 | 1.1574843E−14 | −1.3493504E−08 | 1.5043901E−10 | −1.0572673E−08 |
| A20 | 5.7685159E−14 | −1.5808646E−08 | 1.2111293E−11 | 1.4057360E−08 |
| Surface number | 8 | 9 | 10 | 11 |
| KA | −3.9609134E+01 | 7.2098366E+00 | 8.5557948E−01 | 5.0350473E−01 |
| A3 | 6.3458905E−17 | 7.0175815E−18 | 1.6527920E−18 | −1.2229102E−18 |
| A4 | 1.1007151E−02 | −1.8898190E−02 | −1.3551371E−02 | −1.3306730E−02 |
| A5 | −5.2976432E−03 | −2.1237439E−03 | −7.5113044E−04 | 3.0860264E−03 |
| A6 | −5.7210835E−03 | 3.4154270E−03 | 3.3457544E−03 | 2.2186632E−02 |
| A7 | 4.0425567E−03 | 1.4978201E−05 | −1.0763533E−03 | −1.4194293E−03 |
| A8 | 2.0949237E−03 | −7.4942780E−04 | −4.9793329E−04 | −1.5257188E−02 |
| A9 | −1.0028326E−03 | 6.7415393E−06 | 3.7577963E−04 | 1.0503861E−03 |
| A10 | −3.9688157E−04 | 9.2642665E−05 | 5.0615140E−05 | 6.3840268E−03 |
| A11 | 1.1112913E−04 | −1.1197744E−06 | −6.5217525E−05 | −3.6946827E−04 |
| A12 | 4.2280014E−05 | −6.6775513E−06 | −5.7358282E−06 | −1.6901899E−03 |
| A13 | −6.9706318E−06 | 7.2252441E−08 | 6.5972737E−06 | 7.1417715E−05 |
| A14 | −2.6650991E−06 | 2.9153049E−07 | 6.9252161E−07 | 2.7752623E−04 |
| A15 | 2.5410352E−07 | −2.3917424E−09 | −3.9156144E−07 | −7.9068506E−06 |
| A16 | 9.8565663E−08 | −7.6142306E−09 | −5.4970325E−08 | −2.7295578E−05 |
| A17 | −5.0120698E−09 | 4.0927449E−11 | 1.2643686E−08 | 4.6979728E−07 |
| A18 | −1.9780973E−09 | 1.0946075E−10 | 2.2706699E−09 | 1.4741525E−06 |
| A19 | 4.1408048E−11 | −2.8730911E−13 | −1.7160560E−10 | −1.1643013E−08 |
| A20 | 1.6628884E−11 | −6.6641617E−13 | −3.7275101E−11 | −3.3651276E−08 |
| Surface number | | 12 | 13 | |
| KA | | 7.7266793E−01 | −4.7835701E+01 | |
| A3 | | 1.6322517E−18 | 5.6155528E−19 | |
| A4 | | −1.3688378E−02 | −1.0708391E−02 | |
| A5 | | 2.9798597E−03 | 7.7966683E−03 | |
| A6 | | 2.2150948E−02 | 2.6353089E−03 | |
| A7 | | 2.4725521E−04 | −4.2298541E−03 | |
| A8 | | −1.5704059E−02 | 2.9861431E−04 | |
| A9 | | −4.5929854E−05 | 1.2728603E−03 | |
| A10 | | 6.9885785E−03 | −3.2659808E−04 | |
| A11 | | −5.5457083E−05 | −2.3158331E−04 | |
| A12 | | −1.9558817E−03 | 8.3586840E−05 | |
| A13 | | 2.2129457E−05 | 2.5921333E−05 | |
| A14 | | 3.3788028E−04 | −1.1024931E−05 | |
| A15 | | −3.5351556E−06 | −1.7478165E−06 | |
| A16 | | −3.4893514E−05 | 8.0863931E−07 | |
| A17 | | 2.6960355E−07 | 6.5142548E−08 | |
| A18 | | 1.9769549E−06 | −3.1185380E−08 | |
| A19 | | −8.1187627E−09 | −1.0308395E−09 | |
| A20 | | −4.7345139E−08 | 4.9258287E−10 | |

Table 10 shows values corresponding to the conditional expressions (1) to (4) of the imaging lenses of Examples 1 to 3. It should be noted that, in the above-mentioned examples, the d-line is set as the reference wavelength, and the values shown in the following Table 10 are values at the reference wavelength.

TABLE 10

| Expression number | Conditional expression | Example 1 | Example 2 | Example 3 |
|---|---|---|---|---|
| (1) | f/f12 | −0.678 | −0.673 | −0.741 |
| (2) | f/f1 | −0.158 | −0.160 | −0.122 |
| (3) | f/f2 | −0.471 | −0.473 | −0.581 |
| (4) | f1/f2 | 2.987 | 2.963 | 4.756 |

As can be seen from the above-mentioned data, all the imaging lenses of Example 1 to 3 satisfy the conditional expressions (1) to (4), and are imaging lenses each of which has a small amount of focus shift caused by temperature fluctuation.

Further, the lens system disclosed in JP2014-85559A is a wide-angle lens system of which an angle of view ranges from 130° to 190°. Thus, in combination between the lens system and an imaging element of the recent general full HD (1920×1080 pixels) class, the number of pixels, which can be allocated in a region far from the front, among pixels of the imaging element becomes small, that is, a resolution of the region far from the front becomes low. As a result, there is a problem in that it is difficult to detect a traffic light and/or a brake lamp operated by image identification software. However, the angles of view of all the imaging lenses of Examples 1 to 3 are about 110°, and the number of pixels, which can be allocated in the region far from the front, can be set to be large. As a result, it is possible to solve such a problem.

Figure 7:
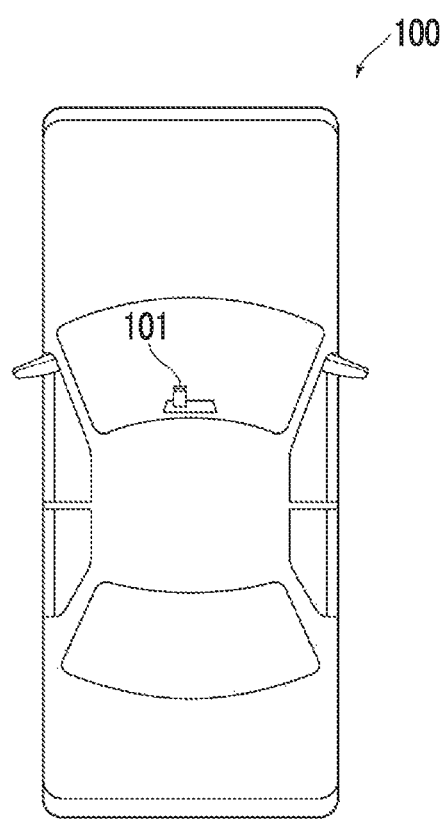
FIG. 7 is a schematic configuration diagram of an imaging apparatus according to an embodiment of the present invention.

Next, an imaging apparatus according to an embodiment of the present invention will be described. Here, as an embodiment of the imaging apparatus of the present invention, an example in a case of applying the invention to an on-board camera will be described. FIG. 7 shows a situation where the on-board camera is mounted on a vehicle.

In FIG. 7, a vehicle 100 comprises an in-vehicle camera 101 (imaging apparatus) which is mounted on the rear of the rearview mirror in order to capture an image in a range of field of view which is the same as that of a driver. The in-vehicle camera 101 comprises: the imaging lens according to the embodiment of the present invention; and an imaging element that converts an optical image, which is formed through an imaging lens, into an electrical signal. Since the on-board camera (in-vehicle camera 101) of the present embodiment comprises the imaging lens of the present invention, it is possible to appropriately perform imaging in a wide temperature range.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens component are not limited to the values shown in the numerical examples, and different values may be used therefor.

The imaging apparatus according to the embodiment of the present invention may also be provided as not only an in-vehicle camera but also an outside-vehicle camera. Further, in addition to the on-board camera, the imaging apparatus may include various embodiments such as a mobile terminal camera, a surveillance camera, and a digital camera.

EXPLANATION OF REFERENCES

100: vehicle
101: in-vehicle camera
L1 to L6: lens
Sim: image plane
St: aperture diaphragm
wa: on-axis rays
wb: rays with maximum angle of view
Z: optical axis

What is claimed is:

1. An imaging lens consisting of, in order from an object side:
   a first lens that is convex toward the object side and has a negative refractive power;
   a second lens that has a negative refractive power;
   a third lens that has a positive refractive power;
   a fourth lens that has a positive refractive power;
   a fifth lens that has a positive refractive power; and
   a sixth lens that has a negative refractive power,
   wherein the following conditional expressions (1) to (4) are satisfied.

$$-0.89 < f/f12 < -0.53 \tag{1}$$

$$-0.19 < f/f1 < -0.1 \tag{2}$$

$$-0.70 < f/f2 < -0.45 \tag{3}$$

$$2.4 < f1/f2 < 5.7 \tag{4}$$

where f is a focal length of a whole system,
   f12 is a composite focal length of the first lens and the second lens,
   f1 is a focal length of the first lens, and
   f2 is a focal length of the second lens.

2. The imaging lens according to claim 1, wherein the following conditional expression (1-1) is satisfied.

$$-0.81 < f/f12 < -0.61 \tag{1-1}$$

3. The imaging lens according to claim 1, wherein the following conditional expression (2-1) is satisfied.

$$-0.17 < f/f1 < -0.11 \tag{2-1}$$

4. The imaging lens according to claim 2, wherein the following conditional expression (2-1) is satisfied.

$$-0.17 < f/f1 < -0.11 \tag{2-1}$$

5. The imaging lens according to claim 1, wherein the following conditional expression (3-1) is satisfied.

$$-0.64 < f/f2 < -0.47 \tag{3-1}$$

6. The imaging lens according to claim 2, wherein the following conditional expression (3-1) is satisfied.

$$-0.64 < f/f2 < -0.47 \tag{3-1}$$

7. The imaging lens according to claim 3, wherein the following conditional expression (3-1) is satisfied.

$$-0.64 < f/f2 < -0.47 \tag{3-1}$$

8. The imaging lens according to claim 4,
wherein the following conditional expression (3-1) is satisfied.

$$-0.64 < f/f2 < -0.47 \quad (3\text{-}1)$$

9. The imaging lens according to claim 1,
wherein the following conditional expression (4-1) is satisfied.

$$2.7 < f1/f2 < 5.2 \quad (4\text{-}1)$$

10. The imaging lens according to claim 2,
wherein the following conditional expression (4-1) is satisfied.

$$2.7 < f1/f2 < 5.2 \quad (4\text{-}1)$$

11. The imaging lens according to claim 3,
wherein the following conditional expression (4-1) is satisfied.

$$2.7 < f1/f2 < 5.2 \quad (4\text{-}1)$$

12. The imaging lens according to claim 4,
wherein the following conditional expression (4-1) is satisfied.

$$2.7 < f1/f2 < 5.2 \quad (4\text{-}1)$$

13. The imaging lens according to claim 5,
wherein the following conditional expression (4-1) is satisfied.

$$2.7 < f1/f2 < 5.2 \quad (4\text{-}1)$$

14. The imaging lens according to claim 6,
wherein the following conditional expression (4-1) is satisfied.

$$2.7 < f1/f2 < 5.2 \quad (4\text{-}1)$$

15. The imaging lens according to claim 7,
wherein the following conditional expression (4-1) is satisfied.

$$2.7 < f1/f2 < 5.2 \quad (4\text{-}1)$$

16. The imaging lens according to claim 8,
wherein the following conditional expression (4-1) is satisfied.

$$2.7 < f1/f2 < 5.2 \quad (4\text{-}1)$$

17. An imaging apparatus comprising the imaging lens according to claim 1.

18. An imaging apparatus comprising the imaging lens according to claim 2.

19. An imaging apparatus comprising the imaging lens according to claim 3.

20. An imaging apparatus comprising the imaging lens according to claim 4.

* * * * *